United States Patent [19]

Fukami et al.

[11] 4,306,894
[45] Dec. 22, 1981

[54] CANISTER FOR FUEL EVAPORATIVE EMISSION CONTROL SYSTEMS

[75] Inventors: Akira Fukami, Okazaki; Hiroki Noguchi, Oobu; Junzi Mizuno, Okazaki; Takeshi Ishii, Anjo, all of Japan

[73] Assignees: Nippondenso Co., Ltd., Kariya; Nippon Soken, Inc., Nishio, both of Japan

[21] Appl. No.: 166,691

[22] Filed: Jul. 2, 1980

[30] Foreign Application Priority Data

Jul. 6, 1979 [JP] Japan ................................ 54-86089

[51] Int. Cl.³ ............................................ B01D 50/00
[52] U.S. Cl. .................................... 55/316; 55/387; 55/465; 55/476; 55/509; 123/519
[58] Field of Search .............. 55/316, 465, 387, 476, 55/509, 515, 518; 210/444, 284, 288; 123/519

[56] References Cited

U.S. PATENT DOCUMENTS

| 3,169,112 | 2/1965 | Nelson | 55/316 |
| 3,683,597 | 8/1972 | Beveridge et al. | 55/316 |
| 3,730,158 | 5/1973 | Amand | 55/316 |
| 3,831,353 | 8/1974 | Toth | 55/387 |
| 4,173,207 | 11/1979 | Hiramatsuo | 123/519 |

FOREIGN PATENT DOCUMENTS 1155678 10/1963 Fed. Rep. of Germany ........ 55/387

Primary Examiner—Bernard Nozick
Attorney, Agent, or Firm—Cushman, Darby & Cushman

[57] ABSTRACT

A canister for a fuel evaporative emission control system of an engine; A mass of adsorbent contained in a canister casing is divided into at least two layers by a pair of spaced filter plates, so that the fuel vapors can be diffused into all parts of the adsorbent layers under the deflecting action of the filter plate and the uniforming action of a hollow space defined between the paired filter plates.

4 Claims, 4 Drawing Figures

CANISTER FOR FUEL EVAPORATIVE EMISSION CONTROL SYSTEMS

BACKGROUND OF THE INVENTION

1. Field of the Invention

The present invention relates to an improvement in a structure of a canister used in a fuel evaporative emission control system of an internal combustion engine for a motor vehicle.

2. Description of the Prior Art

There has been a fuel evaporative emission control system for capturing evaporated fuel from a fuel tank or a float chamber of a carburetor to reduce HC emissions. For adsorbing the fuel vapors, a canister filled with a mass of adsorbent substance such as activated carbon particles is used in the fuel evaporative emission control system. In the canister, the fuel vapors are forcibly introduced into the adsorbent through a passage extending into the interior, for preventing the vapors from being bypassed directly to the engine intake system without passing through the adsorbent. One of the defects of the canister can be seen in the fact that the whole adsorbent is not uniformly and effectively utilized for capturing the fuel vapors. More specifically, the fuel vapors introduced into the adsorbent tend to flow downstream. Therefore, a part of the adsorbent located above the level of the opening of the vapor introducing passage remains substantially unused for capturing the fuel vapors, except that the vapors reach there under feeble effect of diffusion. Further, the diameter of the vapor introducing passage is considerably smaller as compared with the cross-sectional area of the adsorbent contained in the canister. Therefore, the flow of the fuel vapors tends to be concentrated on a local region of the adsorbent, more specifically on the downstream region of the passage opening.

SUMMARY OF THE INVENTION

In the fuel evaporative emission control system, an object of the invention is to obviate the defects of the hitherto known canister and provide an improved structure of the canister which has enhanced adsorptive capability. In view of the above, the canister according to the present invention is characterized by a feature that the canister comprises a body casing provided at one end with a fuel vapor inlet port communicated to a fuel vapor source and a fuel outlet port through which the fuel is purged from the canister, and at the other end with an air inlet port, a mass of adsorbent substance filled in the body casing for trapping the fuel vapors, a passage communicated to the fuel vapor inlet port for introducing the fuel vapors into the adsorbent, and means for defining at least one hollow space in the adsorbent in a manner to divide the adsorbent into at least two adsorbent layers in the longitudinal direction of the casing.

The hollow space is provided in the adsorbent by a pair of filter plates, so that the adsorbent is divided into the upper and the lower adsorbent layer. The flow of fuel vapors is deflected upwardly by the filter in the bottom region of the upper adsorbent layer. While the hollow space causes the fuel vapors to flow into the lower adsorbent layer uniformly. Whereby the whole mass of adsorbent particles can be utilized effectively for capturing the fuel vapors. And the canister is enhanced significantly adsorptive capability.

BRIEF DESCRIPTION OF THE DRAWINGS

The present invention will be described by way of example with reference to the accompanying drawings.

Same reference numerals are used to designate same or similar parts throughout the figures.

DETAILED DESCRIPTION OF THE PREFERRED EMBODIMENTS

Figure 1:
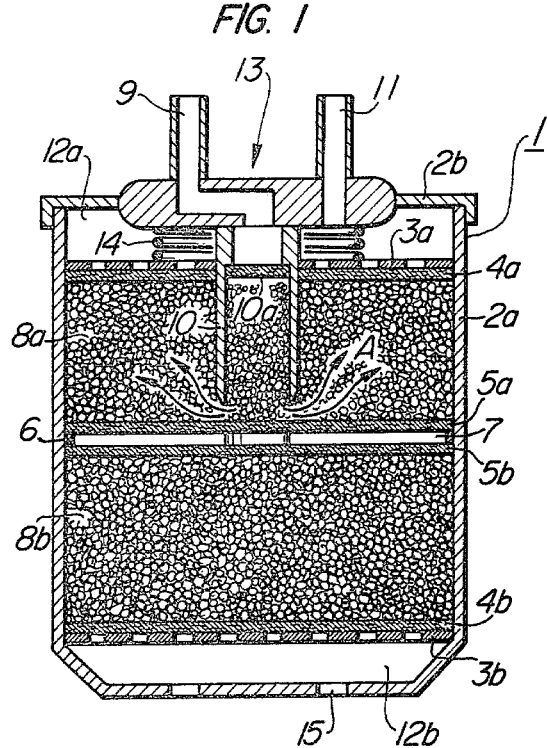
FIG. 1 is a vertical sectional view of a canister according to an embodiment of the invention.
Figure 2:
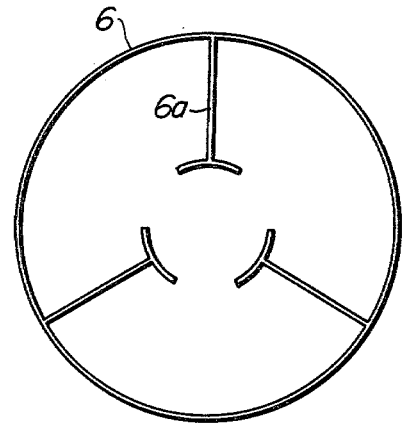
FIG. 2 is a top plan view of a spacer ring used in a canister according to the invention.

Referring to FIG. 1, a canister according to a first embodiment of the invention is generally denoted by a reference numeral 1 and comprises a cylindrical case body 2a having a top cover 2b. A pair of perforated plates 3a and 3b are fixedly disposed within the case body 2a at positions near the top and the bottom of the case 2a, respectively. A filter 4a is fixedly mounted directly under the upper perforated plate 3a, while a second filter 4b is mounted directly on the lower perforated plate 3b. Further, disposed within the case body 2a at an intermediate or middle portion thereof are a pair of filters 5a and 5b which are separated from each other by means of an interposed spacer ring 6 having inner ribs 6a (refer to FIG. 2) so as to define a space 7 between the filter plates 5a and 5b. The inner ribs 6a of the spacer ring 6 each extending radially inwardly and having a T-like shape as shown in FIG. 2 serve for a course to support and mechanically reinforce the filter plates 5a and 5b with a predetermined distance being maintained therebetween. A space defined between the top filter 4a and the intermediate filter 5a is filled with an adsorbent substance such as activated carbon to form a first adsorbent layer 8a. On the other hand, a space defined between the lower filter 4b and the other intermediate filter 5b is filled with the adsorbent to thereby form a second adsorbent layer 8b.

An inlet/outlet assembly 13 is fixedly secured to the top cover 2b and has a fuel vapor inlet passage 9 having one end communicated to a fuel tank (not shown). The other end of the inlet passage 9 leads to the first adsorbent layer 8a through a conduit 10 which extends downwardly through the perforated plate 3a and the filter 4a and has a lower end opened short of the filter plate 5a. A filter disc 10a is fixedly disposed in the conduit 10 substantially on a level with the perforated plate 3a and the filter 4a. A fuel outlet passage 11 is provided in the inlet/outlet assembly 13 in juxtaposition with the inlet passage 9 and communicated at an external end to an intake system of an internal combustion engine (not shown). The other or inner end of the fuel outlet passage 11 is opened in a chamber 12a defined within the case 2a between the perforated plate 3a and the top cover 2b. Formed below the second absorbent layer 8b is a chamber 12b which is communicated to the atmosphere through air intake ports 15 formed in the bottom of the canister case 2a. Reference numeral 14 denotes a compression spring interposed between the inlet/outlet assembly 13 and the perforated plate 3a.

With the structure of the fuel vapor trapping canister described above, fuel vapors produced from a fuel tank (not shown) flow at first into the first adsorbent layer 8a through the fuel vapor inlet passage 9 and the conduit 10 and hence into the space 7, which becomes then filled with fuel vapors over the whole sectional area of the canister casing 1. The fuel vapors thus can flow into the second adsorbent layer 8b from the space 7 in a much uniformed flow over the whole sectional area of the canister casing 1. As the result, the full volume of the adsorbent layer 8b can be utilized for trapping the fuel vapors. Additionally, the filter 5a provides some flow resistance to the flow of fuel vapors from the conduit 10, thereby the fuel vapors are diffused into the upper region of the first adsorbent layer 8a, as indicated by arrows A.

In this manner, the adsorptive capability of the canister according to the invention is significantly improved. In reality, it has been found that the capability of the canister manufactured according to the invention is enhanced about 60% as compared with the hitherto known canister of a corresponding dimension. By the way, it will be readily understood that when the pressure in the intake system becomes sufficiently low, air is pulled up through the adsorbent layers 8a and 8b from the air intake ports 15. The fuel vapors are purged from the adsorbent and fed to the intake system.

Figure 3:
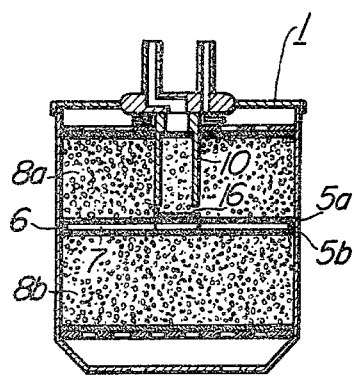
FIG. 3 is a vertical sectional view to show another embodiment of the invention.

FIG. 3 shows another embodiment of the invention which differs from the canister described above merely in a vapor flow deflecting disc plate 16. The plate is made of a solid material and has a diameter at least equal to that of the conduit 10. And the plate is disposed on the filter plate 5a at a position immediately below the lower open end of the conduit 10. The plate 16 is effective in deflecting the flow of fuel vapors and increasing amount of the fuel vapors flowing from the conduit 10 toward the upper region of the first adsorbent layer 8a.

Figure 4:
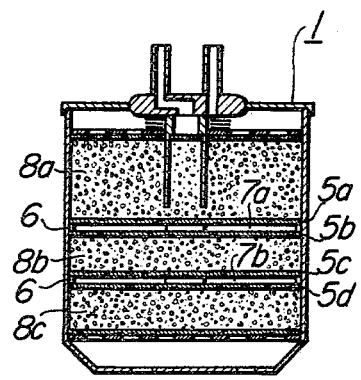
FIG. 4 is a similar view to FIG. 1 and shows a further embodiment of the invention.

FIG. 4 shows a further embodiment of the invention which differs from the first described one in an additional space 7b. The space 7b of the substantially same structure and function as the space 7 is provided between additional filters 5c and 5d to form a third adsorbent layer 8c. With the structure of the canister shown in FIG. 4, a more uniform flow of fuel vapos can be assured throughout the whole adsorbent. As the result, the capability of the canister is improved correspondingly. In connection with the embodiment shown in FIG. 4, it should be noted that more than two spaces (7, 7b) may be provided to enhance much more the overall capability of the canister.

In summary, according to the teaching of the invention, the whole adsorbent can be more effectively and uniformly utilized for adsorbing fuel vapors. As the result, the adsorptive capability of the canister is improved significantly. Although preferred embodiments of the invention have been illustrated and described in the foregoing, many and various modifications can be suggested readily. For example, the vapor inlet passage 9 may be additionally communicated to a float chamber of a carburetor. The filter 5a or 5b may be replaced by a metal wire mesh, a perforated plate or the like. It is intended that the invention encompasses all these modifications and variations so far as they fall within the scope and the spirit of the invention.

What is claimed is:

1. A canister for a fuel evaporative emission control system of an internal combustion engine, comprising:
   a body casing provided at one end with a fuel vapor inlet port for communication with a fuel vapor source and a fuel vapor outlet port through which the fuel vapor is purged from said canister, and at the other end with an air inlet port;
   a mass of adsorbent substance substantially filling said body casing for trapping fuel vapor, said mass having a first portion adjacent said one end and a second portion adjacent said other end;
   a conduit inserted into said first mass portion from said one end and communicated to said fuel vapor inlet port for introducing fuel vapor into said first mass portion;
   and
   means defining a hollow space between said first and second mass portions, said defining means including a pair of spaced filter plates arranged to define therebetween said hollow space, each of said filter plates being transmissive of fuel vapor and having one surface facing said first and second mass portions, respectively, whereby the fuel vapor flows first into said first mass portion and in turn into said second mass portion through said hollow space.

2. A canister as set forth in claim 1, wherein said defining means further includes a spacer disposed between said pair of filter plates, said spacer having an annular spacer ring and a plurality of ribs extending radially inwardly from said spacer ring.

3. A canister as set forth in claim 1, further comprising a solid deflecting plate disposed on said defining means adjacent and opposed to the outlet end of said conduit communicated to said fuel vapor inlet port so that fuel vapor introduced into said first mass portion is deflected and diffused uniformly into the whole adsorbent contained in said first mass portion.

4. A canister for a fuel evaporative emission control system of an internal combustion engine, comprising:
   a body casing provided at one end with a fuel vapor inlet port for communication with a fuel vapor source and a fuel vapor outlet port through which the fuel vapor is purged from said canister, and at the other end with an air inlet port;
   a mass of adsorbent substance substantially filling said body casing for trapping fuel vapor, said mass having at least three portions, a first adjacent said one end, a second adjacent said other end, and a third between said first and second portions;
   a conduit inserted into said first mass portion from said one end and communicated to said fuel vapor inlet port for introducing fuel vapor into said first mass portion;
   a first pair of spaced fuel-vapor-transmissive filter plates defining a first hollow space between said first and third mass portions, each of said filter plates being arranged to have one surface facing said first and third mass portions, respectively, so as to define said first hollow space therebetween;
   and
   a second pair of spaced fuel-vapor-transmissive filter plates defining a second hollow space between said second and third mass portions, each of said second pair of filter plates being arranged to have one surface facing said second and third mass portions, respectively, so as to define said second hollow space therebetween, whereby fuel vapor introduced into said first mass portion flows through said first hollow space into said third mass portion, and in turn into said second mass portion through said second hollow space.

* * * * *